United States Patent
Sugimoto et al.

(10) Patent No.: US 12,104,046 B2
(45) Date of Patent: Oct. 1, 2024

(54) RUBBER COMPOSITION FOR TIRE

(71) Applicant: The Yokohama Rubber Co., Ltd., Kanagawa (JP)

(72) Inventors: Hiroki Sugimoto, Kanagawa (JP); Rie Nakajima, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/576,038

(22) PCT Filed: Mar. 25, 2022

(86) PCT No.: PCT/JP2022/014283
§ 371 (c)(1),
(2) Date: Jan. 2, 2024

(87) PCT Pub. No.: WO2023/281855
PCT Pub. Date: Jan. 12, 2023

(65) Prior Publication Data
US 2024/0262990 A1    Aug. 8, 2024

(30) Foreign Application Priority Data
Jul. 7, 2021 (JP) .................... 2021-112738

(51) Int. Cl.
*C08L 15/00* (2006.01)
*B60C 1/00* (2006.01)
*C08K 3/36* (2006.01)
*C08K 5/5419* (2006.01)

(52) U.S. Cl.
CPC ............ *C08L 15/00* (2013.01); *B60C 1/0016* (2013.01); *C08K 3/36* (2013.01); *C08K 5/5419* (2013.01); *C08L 2205/03* (2013.01)

(58) Field of Classification Search
CPC ....... C08L 15/00; C08L 2205/03; C08K 3/36; C08K 5/5419; B60C 1/0016

USPC .......................................... 524/265
See application file for complete search history.

(56) References Cited

U.S. PATENT DOCUMENTS

| | | | |
|---|---|---|---|
| 2015/0148447 A1* | 5/2015 | Takeda | C08C 19/44 523/156 |
| 2017/0291450 A1* | 10/2017 | Izumo | C08L 57/02 |
| 2018/0273724 A1* | 9/2018 | Miyazaki | B60C 1/0016 |
| 2020/0140664 A1* | 5/2020 | Nishikawa | B60C 1/0016 |
| 2021/0252912 A1* | 8/2021 | Murase | C08L 15/00 |

FOREIGN PATENT DOCUMENTS

| | | | |
|---|---|---|---|
| JP | 2013-227375 A | 11/2013 | |
| JP | 2013-227400 A | 11/2013 | |
| JP | 2017-75227 A | 4/2017 | |
| JP | 2017-190364 A | 10/2017 | |
| JP | 2019-104484 A | 6/2019 | |
| JP | 2020-29474 A | 2/2020 | |
| JP | 2020-75999 A | 5/2020 | |

* cited by examiner

*Primary Examiner* — Kelechi C Egwim
(74) *Attorney, Agent, or Firm* — Thorpe North & Western

(57) ABSTRACT

A rubber composition contains 10-50 parts by mass of a thermoplastic resin in 100 parts by mass of a diene rubber containing 60 mass % or more of a styrene-butadiene rubber having a styrene content of 5-30 mass % and a vinyl content of 10-35 mass %. In a mixture containing the diene rubber and the thermoplastic resin in a mass ratio of 1:1, a difference ($T_{ga}$–$T_{gm}$) between a theoretical value ($T_{ga}$) of a glass transition temperature of the mixture calculated based on an average glass transition temperature ($T_{g1}$) of the diene rubber and a glass transition temperature ($T_{g2}$) of the thermoplastic resin, and a measurement value ($T_{gm}$) of a glass transition temperature of the mixture, is lower than 5° C., and a difference ($T_{g2}$–$T_{g1}$) is 50-105° C. An amount of the thermoplastic resin is 30 mass % or more in 100 mass % total of a plasticizer component contained in the rubber composition.

12 Claims, No Drawings

RUBBER COMPOSITION FOR TIRE

TECHNICAL FIELD

The present technology relates to a rubber composition for a tire providing performance on snow and dry grip performance in a compatible manner.

BACKGROUND ART

Important performances required for an all-season tire include performance on snow and dry grip performance (e.g., see Japan Unexamined Patent Publication No. 2020-029474 A). To improve the dry grip performance, typically, a method of increasing the glass transition temperature of a rubber composition for a tire and a method of increasing a blended amount of a filler having a high reinforcing property have been known. However, in these methods, there has been a problem of deterioration in performance on snow, and it has been difficult to provide dry grip performance and performance on snow in a compatible manner.

Meanwhile, to enhance performance on snow, it has been proposed that the average glass transition temperature of a diene rubber be set low (e.g., see Japan Unexamined Patent Publication No. 2020-029474 A). When the average glass transition temperature of a diene rubber is set low, it is difficult to ensure rubber strength, and dry grip performance may deteriorate. Thus, there has been a demand for providing dry grip performance and performance on snow of a rubber composition for a tire in a compatible manner at a high level.

SUMMARY

The present technology provides a rubber composition for a tire providing performance on snow and dry grip performance in a compatible manner.

The rubber composition for a tire of an embodiment of the present technology contains from 10 to 50 parts by mass of a thermoplastic resin in 100 parts by mass of a diene rubber containing 60 mass % or more of a styrene-butadiene rubber, the styrene-butadiene rubber having a styrene content of from 5 to 30 mass % and a vinyl content of from 10 to 35 mass %, a mixture containing the diene rubber and the thermoplastic resin in a mass ratio of 1:1 satisfying a relationship where a difference (Tga−Tgm) between a theoretical value (Tga) of a glass transition temperature of the mixture calculated based on an average glass transition temperature (Tg1) of the diene rubber and a glass transition temperature (Tg2) of the thermoplastic resin, and a measurement value (Tgm) of a glass transition temperature of the mixture, is lower than 5° C., and a difference (Tg2−Tg1) between the glass transition temperature (Tg2) of the thermoplastic resin and the average glass transition temperature (Tg1) of the diene rubber is from 50 to 105° C., and an amount of the thermoplastic resin being 30 mass % or more in 100 mass % total of a plasticizer component contained in the rubber composition.

According to the rubber composition for a tire of an embodiment of the present technology, performance on snow and dry grip performance can be improved beyond conventional levels.

The average glass transition temperature (Tg1) of the diene rubber is preferably −45° C. or lower, and the glass transition temperature (Tg2) of the thermoplastic resin is preferably from 30 to 80° C. The ratio of the mass of the thermoplastic resin to the mass of the styrene-butadiene rubber is preferably from 0.1 to 0.6.

The styrene-butadiene rubber preferably has a modification group at at least one terminal of a molecular chain of the styrene-butadiene rubber. Furthermore, the rubber composition for a tire preferably contains from 10 to 150 parts by mass of silica per 100 parts by mass of the diene rubber, and more preferably contains an alkylalkoxysilane containing an alkyl group having from 3 to 8 carbons in an amount of 1 to 20 mass % of the silica amount.

DETAILED DESCRIPTION

The rubber composition for a tire contains a diene rubber containing 60 mass % or more of a styrene-butadiene rubber. The styrene-butadiene rubber has a styrene content of from 5 to 30 mass % and a vinyl content of from 10 to 35 mass %, and has a specific relationship with the thermoplastic resin.

The styrene content in the styrene-butadiene rubber is from 5 to 30 mass %. When the styrene content is 5 mass % or more, good dry grip is achieved. When the styrene content is 30 mass % or less, deterioration in wear resistance can be suppressed. The styrene content is preferably from 10 to 25 mass %, and more preferably from 10 to 20 mass %. In the present specification, the styrene content of the styrene-butadiene rubber is determined by infrared spectroscopy (the Hampton method).

The vinyl content in the styrene-butadiene rubber is from 10 to 35 mass %. When the vinyl content is 10 mass % or more, deterioration in rolling resistance can be suppressed. When the vinyl content is 35 mass % or less, deterioration in wear resistance can be suppressed. The vinyl content is preferably from 20 to 34 mass %, and more preferably from 25 to 32 mass %. In the present specification, the vinyl content of the styrene-butadiene rubber is determined by infrared spectroscopy (the Hampton method).

The styrene-butadiene rubber is preferably a modified styrene-butadiene rubber having a modification group at at least one terminal of a molecular chain of the styrene-butadiene rubber. Examples of the modification group include a carboxy group, an amino group, a hydroxy group, an alkoxy group, a silyl group, an alkoxysilyl group, an oxysilyl group, a silanol group, an epoxy group, an amide group, an isocyanate group, an isothiocyanate group, a carbonyl group, and an aldehyde group.

The diene rubber is only required to be a diene rubber that is typically used in a tire. Examples of the diene rubber other than the styrene-butadiene rubber include natural rubber, isoprene rubber, butadiene rubber, styrene isoprene rubber, isoprene butadiene rubber, ethylene-propylene-diene copolymer rubber, chloroprene rubber, and acrylonitrile butadiene rubber. These diene rubbers may be modified with one or more functional groups. The type of the functional group is not particularly limited, and examples thereof include an epoxy group, carboxy group, amino group, hydroxy group, alkoxy group, silyl group, alkoxysilyl group, amide group, oxysilyl group, silanol group, isocyanate group, isothiocyanate group, carbonyl group, and aldehyde group.

The diene rubber containing the styrene-butadiene rubber preferably has the average glass transition temperature (Tg1) of −45° C. or lower. The average glass transition temperature (Tg1) of the diene rubber of −45° C. or lower is preferred because performance on snow is enhanced. The average glass transition temperature (Tg1) is more preferably from −100° C. to −50° C., and even more preferably from −80° C. to −55° C. In the present specification, for the glass transition temperature of each of the diene rubber, the thermoplastic resin, and the mixture thereof, a thermogram is obtained by differential scanning calorimetry (DSC) at a rate of temperature increase of 20° C./minute and the temperature at the midpoint of the transition region is defined as the glass transition temperature. When the diene rubber is an oil extended product, the glass transition temperature is the glass transition temperature of the diene rubber containing no oil-extending component (the oil).

The rubber composition for a tire contains 60 mass % or more of the styrene-butadiene rubber described above in 100 mass % of the diene rubber. When 60 mass % or more of the styrene-butadiene rubber is contained, performance on snow can be ensured. The amount of the styrene-butadiene rubber is preferably from 60 to 100 mass %, more preferably from 70 to 90 mass %, and even more preferably from 75 to 85 mass %.

For the rubber composition for a tire, it is necessary to combine the diene rubber and the thermoplastic resin in a manner that the diene rubber and the thermoplastic resin simultaneously satisfy the following relationships (i) and (ii). That is, (i) for a mixture in which the diene rubber and the thermoplastic resin are blended in a mass ratio of 1:1 (hereinafter, simply abbreviated as "mixture"), a difference (Tga−Tgm) between a theoretical value (Tga) of a glass transition temperature of the mixture calculated based on an average glass transition temperature (Tg1) of the diene rubber and a glass transition temperature (Tg2) of the thermoplastic resin, and a measurement value (Tgm) of a glass transition temperature of the mixture, is lower than 5° C., and (ii) a difference (Tg2−Tg1) between the glass transition temperature (Tg2) of the thermoplastic resin and the average glass transition temperature (Tg1) of the diene rubber is from 50 to 105° C.

In the present specification, the average glass transition temperature (Tg1) of the diene rubber, the glass transition temperature (Tg2) of the thermoplastic resin, and the glass transition temperature (Tgm) of the mixture are measured by the method described above. Furthermore, the theoretical value (Tga) of the glass transition temperature of the mixture can be calculated as a weighted average value based on the glass transition temperatures and the mass ratio of the diene rubber and the thermoplastic resin.

As in (i) above, when the difference (Tga−Tgm) between the theoretical value (Tga) of the glass transition temperature of the mixture and the measurement value (Tgm) of the glass transition temperature of the mixture is set to lower than 5° C., dry grip and rolling resistance performance are improved. The difference (Tga−Tgm) is preferably from 0 to 4° C., and more preferably from 0 to 2° C.

As in (ii) above, when the difference (Tg2−Tg1) between the glass transition temperature (Tg2) of the thermoplastic resin and the average glass transition temperature (Tg1) of the diene rubber is set to 50° C. or higher, good dry grip performance is achieved. Furthermore, when the difference (Tg2−Tg1) is set to 105° C. or lower, deterioration in braking performance on snow can be suppressed. The difference (Tg2−Tg1) is preferably from 60 to 100° C., and more preferably from 70 to 100° C.

When the rubber composition for a tire contains from 10 to 50 parts by mass of the thermoplastic resin per 100 parts by mass of the diene rubber, performance on snow and dry grip performance can be provided in a compatible manner. When the amount of the thermoplastic resin is less than 10 parts by mass, the effect of improving dry grip performance cannot be adequately achieved. When the amount of the thermoplastic resin is more than 50 parts by mass, performance on snow deteriorates. The blended amount of the thermoplastic resin is preferably from 15 to 45 parts by mass, and more preferably from 20 to 40 parts by mass.

The amount of the thermoplastic resin is preferably 30 mass % or more in 100 mass % total of the plasticizer component contained in the rubber composition. Setting the amount of the thermoplastic resin to 30 mass % or more is preferred because the effect of improving dry grip performance is achieved. The amount of the thermoplastic resin is more preferably from 35 to 100 mass %, and even more preferably from 40 to 100 mass %, in 100 mass % total of the plasticizer component. Note that examples of the plasticizer component contained in the rubber composition include a thermoplastic resin, a natural oil, a synthetic oil, an oil-extending component (oil) contained in diene rubber, and a liquid rubber.

Furthermore, the ratio of the mass of the thermoplastic resin to the mass of the styrene-butadiene rubber described above is preferably from 0.1 to 0.6. The mass ratio of 0.1 or more is preferred because the distribution of the thermoplastic resin in the rubber composition becomes uniform. Furthermore, the mass ratio of 0.6 or less is preferred because the thermoplastic resin is dispersed in the rubber component, which serves as a matrix, in the rubber composition. The ratio of the mass of the thermoplastic resin to the mass of the styrene-butadiene rubber is more preferably from 0.2 to 0.5, and even more preferably from 0.3 to 0.5.

The glass transition temperature (Tg2) of the thermoplastic resin is preferably from 30 to 80° C., more preferably from 35 to 75° C., and even more preferably from 40 to 75° C. Setting the glass transition temperature (Tg2) to 30° C. or higher is preferred because excessive adhesion of the rubber composition can be suppressed. Furthermore, setting the glass transition temperature (Tg2) to 80° C. or lower is preferred because dissolution in the rubber becomes uniform.

The softening point of the thermoplastic resin is preferably from 80 to 125° C., more preferably from 90 to 125° C., and even more preferably from 95 to 125° C. Setting the softening point to 80° C. or higher is preferred because excessive adhesion of the rubber composition can be suppressed. Furthermore, setting the softening point to 125° C. or lower is preferred because dissolution in the rubber becomes uniform. In the present specification, the softening point of a thermoplastic resin is measured in accordance with JIS (Japanese Industrial Standard) K6220-1 (ring and ball method).

The thermoplastic resin is not particularly limited as long as the thermoplastic resin and the diene rubber simultaneously satisfy the relationships (i) and (ii) described above. Examples of the thermoplastic resin include a terpene resin, a terpene phenol resin, a rosin resin, a rosin ester resin, a C5/C9 resin, and a coumarone-indene resin. Among these, a C5/C9 resin and a terpene resin are preferred.

The rubber composition for a tire preferably contains from 10 to 150 parts by mass of silica per 100 parts by mass of the diene rubber, and preferably contains an alkylalkoxysilane containing an alkyl group having from 3 to 8 carbons in an amount of 1 to 20 mass % of the silica amount. Blending of 1 mass % or more of alkylalkoxysilane with respect to the silica amount can improve dispersibility of the silica. Furthermore, blending of 20 mass % or less is preferred because deterioration in a reinforcing property of the silica can be suppressed. The alkylalkoxysilane is blended in an amount of more preferably from 3 to 15 mass %, and even more preferably from 4 to 12 mass %, of the silica amount.

The alkyl group having from 3 to 8 carbons may be in a straight-chain, branched, or cyclic form, or a combination of these, but is preferably in a straight-chain form. Examples of the alkyl group include a propyl group, a butyl group, a pentyl group, a hexyl group, a heptyl group, and an octyl group, and an octyl group is more preferred.

The alkylalkoxysilane is preferably an alkyltrialkoxysilane having three alkoxy groups. Examples of the alkoxy group include a methoxy group, an ethoxy group, a propoxy group, and a butoxy group, and an ethoxy group is preferred.

The rubber composition for a tire contains from 10 to 150 parts by mass of the silica in 100 parts by mass of the diene rubber. Blending of 10 parts by mass or more of the silica can improve wet grip properties and wear resistance. Furthermore, blending of 150 parts by mass or less of the silica can suppress deterioration in rolling resistance. The blended amount of the silica is preferably from 50 to 135 parts by mass, and more preferably from 60 to 125 parts by mass. Examples of the silica include wet silica (hydrous silicic acid), dry silica (silicic anhydride), calcium silicate, and aluminum silicate. One type of these can be used alone, or a combination of two or more types of these can be used. Furthermore, surface-treated silica, in which the surface of silica is surface-treated by a silane coupling agent, may be also used.

In the rubber composition for a tire, a silane coupling agent is preferably blended together with the silica, and good dispersibility of the silica can be achieved. As the silane coupling agent, a type of silane coupling agent that is typically blended together with silica can be used. The silane coupling agent is blended in an amount of preferably from 5 to 15 mass %, and more preferably from 8 to 12 mass %, of the silica amount.

The rubber composition for a tire can contain another inorganic filler besides the silica. Examples of such other inorganic fillers include carbon black, calcium carbonate, magnesium carbonate, talc, clay, mica, alumina, aluminum hydroxide, titanium oxide, and calcium sulfate. One type of these other fillers can be used alone, or a combination of two or more types of these can be used.

The rubber composition for a tire may also contain various additives that are commonly used in a rubber composition for a tire within a range that does not impair the present technology. Examples thereof include vulcanization or crosslinking agents, vulcanization accelerators, anti-aging agents, plasticizers, processing aids, liquid polymers, and thermosetting resins. These additives may be kneaded by any commonly known method to form a rubber composition for a tire, and can be used for vulcanization or crosslinking. Blended amounts of these additives may be any known amount, so long as the present technology is not hindered.

The rubber composition for a tire described above is preferably a rubber composition for a tire tread and can suitably constitute a tread portion of a tire. A tire having a tread portion made of the rubber composition for a tire of an embodiment of the present technology can provide performance on snow and dry grip performance in a compatible manner. Note that the tire may be a pneumatic tire or a non-pneumatic tire.

Embodiments according to the present technology are further described below by Examples. However, the scope of the present technology is not limited to these Examples.

EXAMPLE

Each of rubber compositions for tires (Examples 1 to 5, Standard Example 1, and Comparative Examples 1 to 6) was prepared according to the formulations listed in Table 1 with the compounding agents listed in Table 2 used as common components. With the exception of the sulfur and the vulcanization accelerators, the components were kneaded in a 1.7 L sealed Banbury mixer for 5 minutes, then discharged from the mixer, and cooled at room temperature. This was placed in the 1.7 L sealed Banbury mixer described above, and the sulfur and the vulcanization accelerators were then added and mixed, and thus a rubber composition for a tire was prepared. The blended amounts of the compounding agents shown in Table 2 are expressed as values in parts by mass with respect to 100 parts by mass of the diene rubbers shown in Table 1.

A pneumatic radial tire (tire size: 195/65R15) using each of the rubber compositions for tires obtained as described above in a tread rubber was vulcanization-molded. The dry grip performance and performance on snow were measured based on the testing method described below.

Performance on Snow

The pneumatic tire obtained as described above was assembled on a standard rim, inflated to an air pressure of 250 kPa, and mounted on a test vehicle. The test vehicle was driven on a compacted-snow road surface, and a braking distance at the time when braking was performed from an initial velocity of 40 km/hr was measured. The obtained result was expressed as an index value obtained by calculating a reciprocal thereof, with Standard Example 1 being assigned the value of 100, and shown in the "performance on snow" row. A larger index value indicates a shorter braking distance and superior performance on snow.

Dry Grip Performance

The pneumatic tire obtained as described above was assembled on a standard rim, inflated to an air pressure of 250 kPa, and mounted on a test vehicle. The test vehicle was driven on a dry road surface having relatively few protrusions and recesses, and a braking distance at the time when braking was performed from an initial velocity of 100 km/hr was measured. The obtained result was expressed as an index value obtained by calculating a reciprocal thereof, with Standard Example 1 being assigned the value of 100, and shown in the "dry grip performance" row. A larger index value indicates a shorter braking distance and superior dry grip performance.

TABLE 1

|  |  | Standard Example 1 | Comparative Example 1 | Comparative Example 2 | Comparative Example 3 |
|---|---|---|---|---|---|
| SBR-1 | Parts by mass | 80 | 20 | 80 | 80 |
| SBR-2 | Parts by mass | 20 | 80 | 20 | 20 |

TABLE 1-continued

| | | | | | |
|---|---|---|---|---|---|
| Resin-1 | Parts by mass | | 30 | 5 | 55 |
| Resin-2 | Parts by mass | | | | |
| Silica | Parts by mass | 70 | 70 | 70 | 70 |
| Carbon black | Parts by mass | 5 | 5 | 5 | 5 |
| Coupling agent | Parts by mass | 5.6 | 5.6 | 5.6 | 5.6 |
| Aroma oil | Parts by mass | 50 | 20 | 45 | 0 |
| Average Tg (Tg1) of diene rubber | °C. | −55 | −38 | −55 | −55 |
| Tg (Tg2) of resin | °C. | — | 42 | 42 | 42 |
| Theoretical value (Tga) | °C. | — | −19 | −51 | −21 |
| Measurement value (Tgm) | °C. | — | −23 | −53 | −23 |
| Difference (Tg2−Tg1) | °C. | — | 80 | 97 | 97 |
| Difference (Tga−Tgm) | °C. | — | 4 | 2 | 2 |
| Resin/all plasticizers | — | 0.0 | 0.6 | 0.1 | 1.0 |
| Resin/SBR-1 | — | 0.0 | 1.5 | 0.1 | 0.7 |
| Performance on snow | Index value | 100 | 95 | 100 | 95 |
| Dry grip performance index value | | 100 | 103 | 95 | 110 |

| | | Comparative Example 4 | Comparative Example 5 | Comparative Example 6 | Example 1 |
|---|---|---|---|---|---|
| SBR-1 | Parts by mass | 80 | 80 | 60 | 80 |
| SBR-2 | Parts by mass | 20 | 20 | 40 | 20 |
| Resin-1 | Parts by mass | 10 | | 45 | 30 |
| Resin-2 | Parts by mass | | 30 | | |
| Silica | Parts by mass | 70 | 70 | 70 | 70 |
| Carbon black | Parts by mass | 5 | 5 | 5 | 5 |
| Coupling agent | Parts by mass | 5.6 | 5.6 | 5.6 | 5.6 |
| Aroma oil | Parts by mass | 40 | 20 | 20 | 20 |
| Average Tg (Tg1) of diene rubber | °C. | −55 | −55 | −49 | −55 |
| Tg (Tg2) of resin | °C. | 42 | 65 | 42 | 42 |
| Theoretical value (Tga) | °C. | −46 | −27 | −21 | −33 |
| Measurement value (Tgm) | °C. | −49 | −28 | −27 | −35 |
| Difference (Tg2−Tg1) | °C. | 97 | 120 | 91 | 97 |
| Difference (Tga−Tgm) | °C. | 3 | 1 | 6 | 2 |
| Resin/all plasticizers | — | 0.2 | 0.6 | 1.6 | 0.6 |
| Resin/SBR-1 | — | 0.1 | 0.4 | 0.8 | 0.4 |
| Performance on snow | Index value | 101 | 95 | 100 | 104 |
| Dry grip performance index value | | 95 | 102 | 98 | 105 |

| | | Example 2 | Example 3 | Example 4 | Example 5 |
|---|---|---|---|---|---|
| SBR-1 | Parts by mass | 80 | 80 | 80 | 80 |
| SBR-2 | Parts by mass | 20 | 20 | 20 | 20 |
| Resin-1 | Parts by mass | 10 | 50 | 30 | 15 |
| Resin-2 | Parts by mass | | | | |

TABLE 1-continued

| | | | | | |
|---|---|---|---|---|---|
| Silica | Parts by mass | 70 | 70 | | 70 |
| Carbon black | Parts by mass | 5 | 5 | 75 | 5 |
| Coupling agent | Parts by mass | 5.6 | 5.6 | | 5.6 |
| Aroma oil | Parts by mass | 23 | 0 | 20 | 35 |
| Average Tg (Tg1) of diene rubber | °C. | −55 | −55 | −55 | −55 |
| Tg (Tg2) of resin | °C. | 42 | 42 | 42 | 42 |
| Theoretical value (Tga) | °C. | −46 | −23 | −33 | −43 |
| Measurement value (Tgm) | °C. | −48 | −26 | −35 | −45 |
| Difference (Tg2−Tg1) | °C. | 97 | 97 | 97 | 97 |
| Difference (Tga−Tgm) | °C. | 2 | 3 | 2 | 2 |
| Resin/all plasticizers | — | 0.3 | 1.0 | 0.6 | 0.3 |
| Resin/SBR-1 | — | 0.1 | 0.6 | 0.4 | 0.2 |
| Performance on snow | Index value | 111 | 102 | 102 | 106 |
| Dry grip performance index value | | 102 | 110 | 112 | 102 |

TABLE 2

Common formulation of rubber compositions

| | | |
|---|---|---|
| Stearic acid | 2.0 | Parts by mass |
| Zinc oxide | 3.0 | Parts by mass |
| Anti-aging agent | 2.0 | Parts by mass |
| Sulfur | 2.0 | Parts by mass |
| Vulcanization accelerator 1 | 1.0 | Parts by mass |
| Vulcanization accelerator 2 | 2.0 | Parts by mass |

In Tables 1 and 2, the types of raw materials used are as follows.

SBR-1: Modified solution-polymerized styrene-butadiene rubber containing a hydroxy group, NS612, available from ZS Elastomers Co., Ltd.; glass transition temperature: −61° C.; styrene content: 15 mass %; vinyl content: 31 mass %

SBR-2: Solution-polymerized styrene-butadiene rubber, F3420, available from Asahi Kasei Corporation; glass transition temperature: −32° C.; styrene content: 37 mass %; vinyl content: 44 mass %

Resin-1: C5 resin, IMPERA R1508, available from Eastman; glass transition temperature: 42° C.

Resin-2: Terpene resin, YS resin PX1150N, available from Yasuhara Chemical Co., Ltd.; glass transition temperature: 65° C.

Silica: ZEOSIL 1165MP, available from Solvay; CTAB adsorption specific surface area: 160 m²/g Carbon black: SEAST 9M, available from Tokai Carbon Co., Ltd.; nitrogen adsorption specific surface area: 150 m²/g Coupling agent: Silane coupling agent, Si69, available from Evonik Degussa, bis(triethoxysilylpropyl)tetrasulfide Aroma oil: Extract No. 4S, available from Showa Shell Sekiyu K.K.

Stearic acid: beads stearic acid, available from NOF Corporation

Zinc oxide: Zinc Oxide III, available from Seido Chemical Industry Co., Ltd.

Anti-aging agent: Santoflex 6PPD, available from Flexsys

Sulfur: MUCRON OT-20, available from Shikoku Chemicals Corporation.

Vulcanization accelerator-1: NOCCELER CZ, available from Ouchi Shinko Chemical Industrial Co., Ltd.

Vulcanization accelerator-2: Perkacit DPG, available from Flexsys

As can be seen from Table 1, it was confirmed that the rubber compositions for tires of Examples 1 to 5 each had excellent performance on snow and dry grip performance.

Because the rubber composition for a tire of Comparative Example 1 contained less than 60 mass % of the specific styrene-butadiene rubber, the performance on snow was poor.

Because the rubber composition for a tire of Comparative Example 2 contained less than 10 parts by mass of the thermoplastic resin, the dry grip performance was poor.

Because the rubber composition for a tire of Comparative Example 3 contained more than 50 parts by mass of the thermoplastic resin, the performance on snow was poor.

Because the rubber composition for a tire of Comparative Example 4 contained less than 30 mass % of the thermoplastic resin in 100 mass % total of the plasticizer component, the dry grip performance was poor.

Because the rubber composition for a tire of Comparative Example 5 had the difference (Tg2−Tg1) between Tg1 of the diene rubber and Tg2 of the thermoplastic resin of higher than 105° C., the performance on snow was poor.

Because the rubber composition for a tire of Comparative Example 6 had the difference (Tga−Tgm) between the theoretical value (Tga) and the measurement value (Tgm) of the glass transition temperature of the mixture containing the diene rubber and the thermoplastic resin in the mass ratio of 1:1 of higher than 5° C., the dry grip performance was poor.

The invention claimed is:

1. A rubber composition for a tire, the rubber composition comprising from 10 to 50 parts by mass of a thermoplastic resin in 100 parts by mass of a diene rubber containing 60 mass % or more of a styrene-butadiene rubber, the styrene-butadiene rubber having a styrene content of from 5 to 30 mass % and a vinyl content of from 10 to 35 mass %, a mixture containing the diene rubber and the thermoplastic resin in a mass ratio of 1:1 satisfying a relationship where a difference (Tga−Tgm) between a theoretical value (Tga) of a glass transition temperature of the mixture calculated based on an average glass transition temperature (Tg1) of the diene rubber and a glass transition temperature (Tg2) of the thermoplastic resin, and a measurement value (Tgm) of a glass transition temperature of the mixture, is lower than 5° C., and a difference (Tg2−Tg1) between the glass transition temperature (Tg2) of the thermoplastic resin and the average glass transition temperature (Tg1) of the diene rubber is from 50 to 105° C., and an amount of the thermoplastic resin being 30 mass % or more in 100 mass % total of a plasticizer component contained in the rubber composition.

2. The rubber composition for a tire according to claim 1, wherein the average glass transition temperature (Tg1) of the diene rubber is −45° C. or lower.

3. The rubber composition for a tire according to claim 1, wherein a ratio of a mass of the thermoplastic resin to a mass of the styrene-butadiene rubber is from 0.1 to 0.6.

4. The rubber composition for a tire according to claim 1, wherein the glass transition temperature (Tg2) of the thermoplastic resin is from 30 to 80° C.

5. The rubber composition for a tire according to claim 1, wherein the styrene-butadiene rubber contains a modification group at at least one terminal of a molecular chain of the styrene-butadiene rubber.

6. The rubber composition for a tire according to claim 1, further comprising from 10 to 150 parts by mass of silica per 100 parts by mass of the diene rubber.

7. The rubber composition for a tire according to claim 6, further comprising an alkylalkoxysilane containing an alkyl group having from 3 to 8 carbons in an amount of 1 to 20 mass % of the silica amount.

8. The rubber composition for a tire according to claim 2, wherein a ratio of a mass of the thermoplastic resin to a mass of the styrene-butadiene rubber is from 0.1 to 0.6.

9. The rubber composition for a tire according to claim 8, wherein the glass transition temperature (Tg2) of the thermoplastic resin is from 30 to 80° C.

10. The rubber composition for a tire according to claim 9, wherein the styrene-butadiene rubber contains a modification group at at least one terminal of a molecular chain of the styrene-butadiene rubber.

11. The rubber composition for a tire according to claim 10, further comprising from 10 to 150 parts by mass of silica per 100 parts by mass of the diene rubber.

12. The rubber composition for a tire according to claim 11, further comprising an alkylalkoxysilane containing an alkyl group having from 3 to 8 carbons in an amount of 1 to 20 mass % of the silica amount.

* * * * *